US007669925B2

(12) United States Patent
Beck et al.

(10) Patent No.: US 7,669,925 B2
(45) Date of Patent: Mar. 2, 2010

(54) FRAME OR MESH MOUNTED SYSTEM FOR ATTACHING A TRIM SET TO A MESH MATERIAL SURFACE

(75) Inventors: Gregory E. Beck, South Lyon, MI (US); Jeffrey J. Poniatowski, Royal Oak, MI (US)

(73) Assignee: Intier Automotive Inc., Newmarket, Ontario (CA)

( * ) Notice: Subject to any disclaimer, the term of this patent is extended or adjusted under 35 U.S.C. 154(b) by 710 days.

(21) Appl. No.: 10/591,684

(22) PCT Filed: Mar. 2, 2005

(86) PCT No.: PCT/CA2005/000318

§ 371 (c)(1),
(2), (4) Date: Sep. 5, 2006

(87) PCT Pub. No.: WO2005/084101

PCT Pub. Date: Sep. 15, 2005

(65) Prior Publication Data

US 2007/0175164 A1    Aug. 2, 2007

(51) Int. Cl.
*A47C 31/02* (2006.01)
(52) U.S. Cl. ............. 297/218.3; 297/218.5; 297/452.56
(58) Field of Classification Search ........................ None
See application file for complete search history.

(56) References Cited

U.S. PATENT DOCUMENTS

| 2,589,901 | A |   | 3/1952  | Van Doren |
|-----------|---|---|---------|-----------|
| 5,098,243 | A |   | 3/1992  | Buck      |
| 5,613,817 | A |   | 3/1997  | Bush et al. |
| 6,152,534 | A | * | 11/2000 | Maeda et al. .......... 297/452.56 |

FOREIGN PATENT DOCUMENTS

| DE | 101 20 621 A1 | 11/2002 |
|----|---------------|---------|
| DE | 101 30 250 A1 | 1/2003  |
| JP | 8000857       | 1/1996  |

* cited by examiner

*Primary Examiner*—Jack W. Lavinder
(74) *Attorney, Agent, or Firm*—Clark Hill PLC

(57) ABSTRACT

A trim set attachment assembly is provided comprising a retaining strip attached to a mesh panel encapsulated within a seat frame, and at least one tab extending from the trim set and securedly seating between the retaining strip and the mesh panel, thereby securing the trim set in relation to the mesh panel. The tab includes a trim piece seated within an anchor. The trim piece extends from the trim set to seat beneath the retraining strip atop the mesh panel, while the anchor prevents the trim piece from sliding out from under the retaining strip. The retaining strip includes a base, with at least one retainer extending from the base to secure the trim piece therebeneath. The retaining strip further includes a flange, with at least one connector extending through the mesh panel and the flange to connect the retaining strip to the mesh panel.

12 Claims, 2 Drawing Sheets

FRAME OR MESH MOUNTED SYSTEM FOR ATTACHING A TRIM SET TO A MESH MATERIAL SURFACE

BACKGROUND OF THE INVENTION

1. Field of the Invention

This invention relates to a seat assembly for an automotive vehicle, and more particularly to a system for attaching a fabric trim set to a vehicle seat.

2. Description of the Related Art

A typical vehicle seat assembly includes a seat cushion and a seat back connected to and extending upward from the seat cushion. The seat cushion and the seat back typically comprise a frame defining the edges of the seat cushion or the seat back, and an elastomeric mesh panel encapsulated within the frame in tension to provide occupant support. The frame and mesh support a foam pad or a plurality of foam pads to increase occupant comfort and safety, while a decorative fabric trim set encases the assembly, generally by encasing each of the foam pads, to provide aesthetic appeal. For example, a foam bolster may be included near the edge of the frame, with the trim set fully covering the bolster and attached to both the frame and the mesh panel.

Attaching the bolster and the trim set to the mesh panel has proven challenging. In some instances, the bolster and trim set are sewn to the mesh material. Sewing the bolster and the trim set to the mesh panel after the mesh panel has been encapsulated within the frame is cumbersome and difficult, and may require the use of a special sewing machine. However, if sewing occurs before the mesh panel is stretched, subsequent stretching of the mesh to fit it within the frame loosens the stitches, causing irregularities such as skewed or misaligned sew lines. Because of this, sewing prevents repeatability and decreases quality for mass produced seat assemblies. Additionally, if the trim set becomes damaged, for example by a cigarette burn, or if an owner wishes to change the color of the trim, replacement of the trim set is difficult and costly when the trim set is sewn to the mesh.

Other seat assemblies utilize a combination of male and female fasteners to fasten the trim set to the mesh panel. For example, a receiving strip having a plurality of holes may be fixed within the mesh, while an attachment strip having a plurality of corresponding projections may be attached to the trim set. Attachment occurs by fitting the projections on the attachment strip into the holes on the receiving strip. Typically the trim set wraps around the bolster and attaches to the frame to complete assembly. Since the projections extend from the trim set itself, an assembler cannot actually see the projections during assembly. This type of "blind" assembly is difficult and time-consuming, and it is challenging to ensure that each projection is properly seated within the correct hole. Additionally, this type of connection has proven difficult to use around corners.

It is therefore a goal of the present invention to provide an easily repeatable system for attaching a trim set to a mesh material surface. It is a further goal of the present invention to provide a system for attaching a trim set to a mesh material surface that is easily replaceable. It is a still further goal of the present invention to provide a system allowing non-blind attachment of a trim set to a mesh material surface to minimize difficulty of assembly. It is also a goal of the present invention to provide an attachment system which is easy to use around corners.

SUMMARY OF THE INVENTION

Accordingly, a trim set attachment assembly is provided comprising a retaining strip attached to a mesh panel encapsulated within a seat frame, and at least one tab extending from the trim set and securedly seating between the retaining strip and the mesh panel, thereby securing the trim set in relation to the mesh panel. The tab includes a trim piece seated within an anchor. The trim piece extends from the trim set to seat beneath the retaining strip atop the mesh panel, while the anchor prevents the trim piece from sliding out from under the retaining strip. The retaining strip includes a base, with at least one retainer extending from the base to secure the trim piece therebeneath. The retaining strip further includes a flange, with at least one connector extending through the mesh panel and the flange to connect the retaining strip to the mesh panel.

BRIEF DESCRIPTION OF THE DRAWINGS

Advantages of the invention will be readily appreciated as the same becomes better understood by reference to the following detailed description when considered in connection with the accompanying drawings wherein.

DETAILED DESCRIPTION OF THE PREFERRED EMBODIMENT

Figure 1:
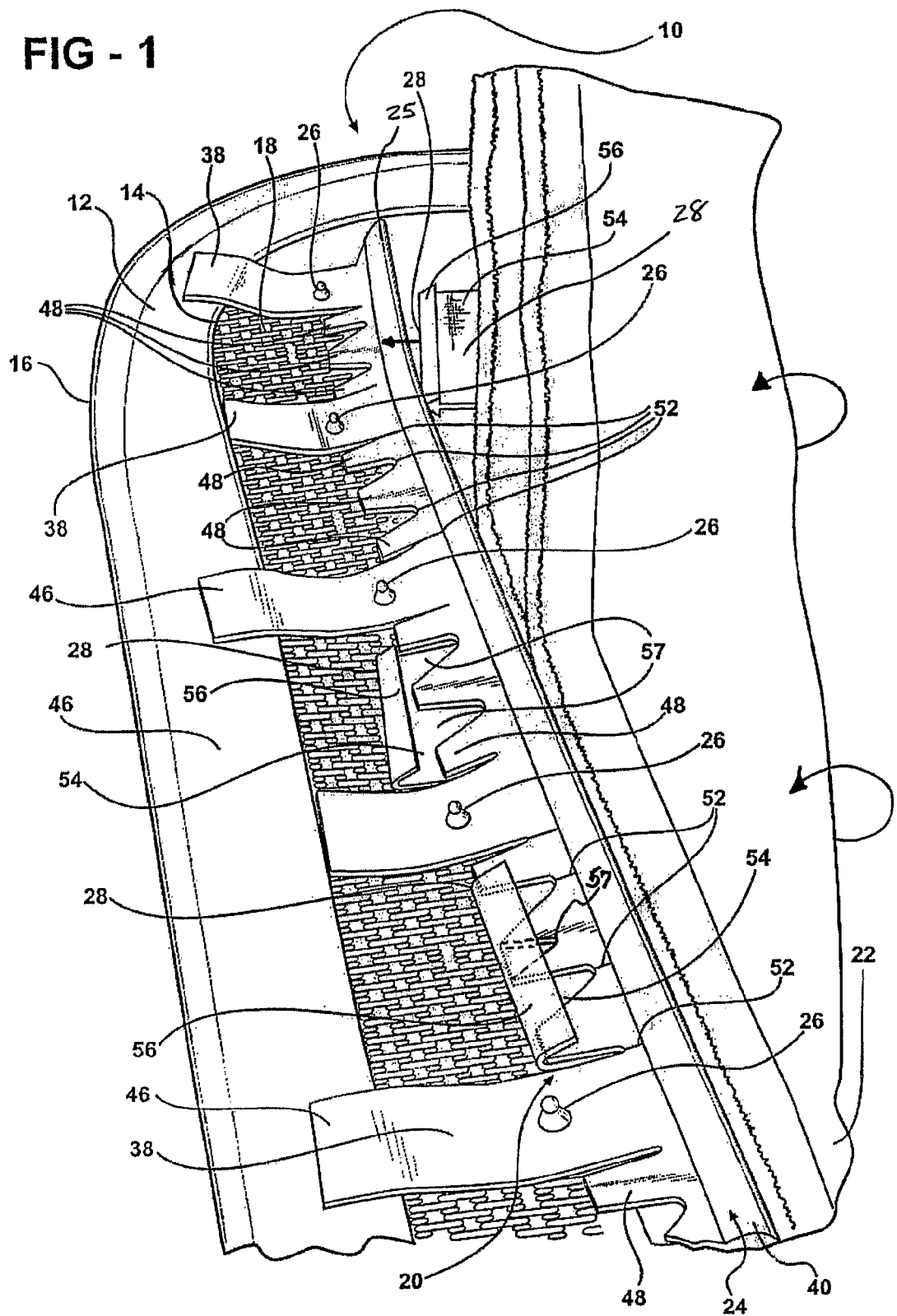
FIG. 1 is a plan view of a portion of a vehicle seat cushion assembly including a preferred embodiment of a trim set attaching mechanism according to the present invention.

Referring to FIG. 1, a portion of a vehicle seat cushion is generally indicated at 10 and includes a frame 12 having an inside edge 14 closest to the center of the cushion 10 and an outside edge 16 furthest from the center of the cushion 10. A mesh panel 18 is encapsulated in tension within the frame 12. A trim set attaching mechanism 20 attaches a trim set 22 to the mesh panel 18. The trim set attaching mechanism 20 preferably includes a retaining strip 24, a plurality of connectors 26 for attaching the retaining strip 24 to the mesh panel 18, and a plurality of tabs 28 extending from the trim set 22 to secure the trim set 22 underneath the retaining strip 24, thereby attaching the trim set 22 to the mesh panel 18.

Figure 2A:
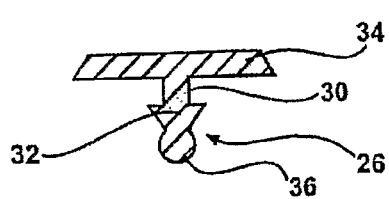
FIG. 2a is a cross-sectional view of a first embodiment of a connector of the trim set attaching mechanism of FIG. 1.
Figure 2B:
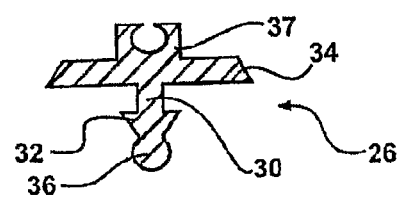
FIG. 2b is a cross-sectional view of a second embodiment of a connector of the trim set attaching mechanism of FIG. 1.

Turning to FIGS. 2a and 2b, the connectors 26 utilized in the preferred embodiment are shown, although any type of connector may be used without compromising the inventive concept. Each connector 26 includes a pin 30 having a collar 32 and extending between a head 34 and a ball 36. The ball 36 and the collar 32 protrude through opposite sides of the mesh panel 18 such that the mesh panel 18 rests between the head 34 and the collar 32. The head 34 prevents the connector 26 from slipping through the mesh panel 18. The connector 26 may protrude through the mesh panel 18 with either the head 34 or the ball 36 extending through the associated opening 42 in the retaining strip 24. The connectors 26 may be individual units, or they may be integrally formed onto a connector strip. Alternatively, the connectors 26 may extend from the retaining strip 24. A protrusion 37 may extend from the head 34 to provide a secondary attachment point for the trim set 22 or any other component of the seat assembly.

Figure 3A:
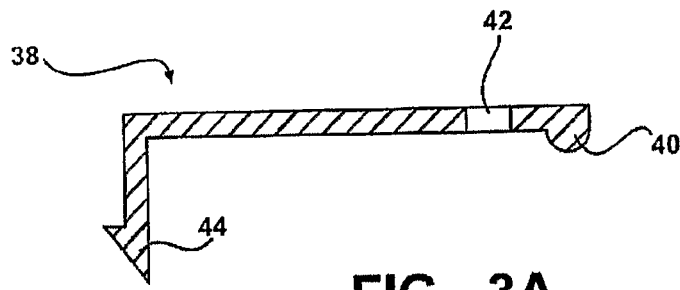
FIG. 3a is a cross-sectional view of a first embodiment of a flange of the trim set attaching mechanism of FIG. 1.
Figure 3B:
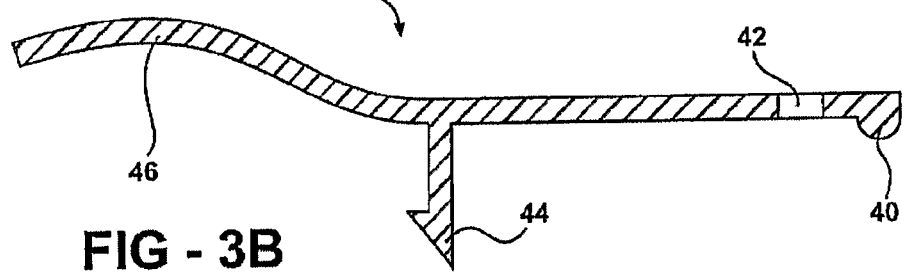
FIG. 3b is a cross-sectional view of a second embodiment of a flange of the trim set attaching mechanism of FIG. 1.

In the preferred embodiment, the retaining strip 24 comprises a plurality of flanges 38 extending from a base 40, shown in cross-section in FIGS. 3a and 3b. The base 40 provides a style line for the trim set 22. Each flange 38 includes an opening 42 for receiving one of the plurality of connectors 26 to attach the flange 38, and therefore the retaining strip 24, to the mesh panel 18. The size and shape of the opening 42 varies depending on the type of vehicle and the type of material used for the trim set 22. Additionally, each flange 38 may include a hook 44 for attaching the retaining strip 24 to the inside edge 14 of the frame 12 to provide superior lateral stability and superior alignment of the trim set 22 during attachment to the mesh panel 18. As shown in FIGS. 1 and 3b, a flange extension 46 may extend toward the frame 12 to provide additional support for a bolster resting atop the seat cushion 10. The extension 46 may also extend beyond the frame 12 to hook onto the outside edge 16 of the frame 12, thereby further securing the retaining strip 24 to the mesh panel 18. The extension 46 may be formed integrally with the flange 38, or it may be a separate piece.

Figure 4A:
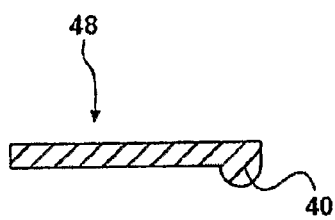
FIG. 4a is a cross-sectional view of a first embodiment of a retainer of the trim set attaching mechanism of FIG. 1.
Figure 4B:
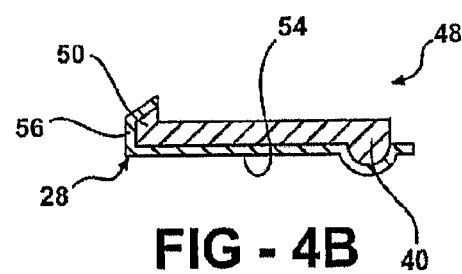
FIG. 4b is a cross-sectional view of a second embodiment of a retainer of the trim set attaching mechanism of FIG. 1.

The retaining strip 24 further comprises a plurality of retainers 48 also extending from the base 40 for securing the tabs 28 therebeneath. FIGS. 4a and 4b depict a cross-sectional view of two embodiments of the retainers 48. As shown in FIG. 4b, each retainer 48 may include a projection 50 for securing the trim set 22 as described below.

The retaining strip 24 preferably includes a slit 52 between each flange 38 or retainer 48 and the adjacent flange 38 or retainer 48 along the base 40. The slits 52 provide superior flexibility, allowing the base 40 to bend easily to fit any configuration of seat assembly. The flanges 38 and retainers 48 maintain proper functionality even as the base 40 bends, allowing use of the trim set attaching mechanism 20 around corners or other difficult locations on a seat assembly.

The retaining strip 24 is preferably plastic, but may comprise any material. The base 40, flanges 38 and retainers 48 may be integrally formed, or formed as separate pieces and joined. Manufacture may be achieved through stamping, extrusion, or any other process able to produce the parts as described. Ideally, long retaining strips 24 are produced and then cut to fit a specific application. However, the retaining strip 24 for each particular application may be injection molded, which may provide a better means of locating the retaining strip 24 along the frame 12.

Figure 5A:
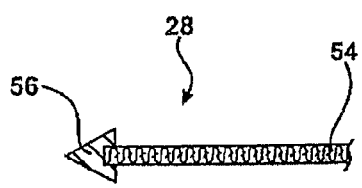
FIG. 5a is a cross-sectional view of a first embodiment of a tab of the trim set attaching mechanism of FIG. 1.
Figure 5B:
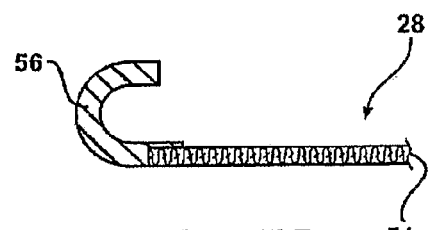
FIG. 5b is a cross-sectional view of a second embodiment of a tab of the trim set attaching mechanism of FIG. 1.

Referring now to FIGS. 5a and 5b, each tab 28 includes a trim piece 54 and an anchor 56, with the trim piece 54 securely attaching within the anchor 56. When assembled, the trim piece 54 seats beneath at least one retainer 48, while the anchor 56 seats just beyond the at least one retainer 48 to lock the trim set 22 into place beneath the retaining strip 24, thereby removably attaching the trim set 22 to the mesh panel 18. The anchor 56 may snugly fit around the projection 50 of the at least one retainer 48 or a portion of the anchor 56 may extend above or below the at least one retainer 48 to maintain position of the trim set 22. The anchor 56 may be any shape, such as an arrow 56 as shown in FIG. 5a, or a J-hook 56 as shown in FIG. 5b. In the preferred embodiment, each trim piece 54 extends from a tab strip (not shown) fixed to the edge of the trim set 22. However, each trim piece 54 may also extend directly from the trim set 22 itself. Preferably, a V-shaped notch 57 between adjacent retainers 48 facilitates easy removal of the trim set assembly 10 by sliding a tool beneath the base 40 and between adjacent retainers 48 through the V-shaped notch 57 to engage the anchor 56, and pulling the tool and the engaged anchor 56 out from under the base 40.

After connecting the retaining strip 24 to the mesh panel 18 using the connectors 26, the tabs 28 attached to the trim set 22 slide underneath the retainers 48 to rest atop the mesh panel 18. Since the tabs 28 extend from the trim set 22, an assembler has visual confirmation of correct assembly, and the difficulty of assembly is greatly decreased. The bolster sits atop the frame 12 to substantially cover the retaining strip 24. The trim set 22 then wraps around the bolster, and preferably connects to the frame 12. The retaining strip 24 and the tabs 28 may provide registration for the trim edge while acting as a stabilizer for lateral forces on the bolster and as a support mechanism for the bolster or added foam. The retaining strip 24 and tabs 28 may also provide a point of attachment for other seat assembly items, while increasing passenger comfort by acting as a pressure reducer during seat ingress or egress.

It can thus be seen that the present invention provides an easily repeatable mechanical means of attaching a trim set 22 to a mesh panel 18, thereby greatly increasing the quality and reproducibility of attachment while reducing scrap mesh and allowing for greater serviceability. Additionally, the trim set 22 may be easily removed and replaced without disturbing the retaining strip 24 and the connectors 26. Since the tabs 28 extend from the trim set 22, attachment occurs in a non-blind manner, increasing accuracy while decreasing assembly time. Furthermore, the flexibility of the retaining strip 24 provides ease of attachment around the corners of a seat cushion, a seat back or a head restraint.

The invention has been described in an illustrative manner, and it is to be understood that the terminology used is intended to be in the nature of words of description rather than of limitation. Many modification and variations of the present invention are possible in light of the above teachings. For example, the retaining strip 24 may be connected directly to the frame 12 using the trim set attachment mechanism 20 without changing the inventive concept, thereby rendering use of the connectors 26 obsolete. As another example, an alternative flange 38 or retainer 48 configuration may be utilized to facilitate alignment of the retaining strip 24 along the frame 12. Furthermore, the frame 12 may be manufactured to include locating elements such as detents, windows or ribs to further facilitate alignment of the retaining strip 24. It is, therefore, to be understood that within the scope of the appended claims, the invention may be practiced in a substantially equivalent way other than as specifically described.

What is claimed is:

1. A trim set attachment assembly for removably attaching a trim set to a mesh panel of an automotive seat assembly, said trim set attachment assembly comprising:

a retaining strip having an elongated base, at least one retainer extending transversely from said base to a distal end, and a plurality of flanges extending transversely from said base adjacent said at least one retainer;

at least one connector coupled between at least one of said flanges and the mesh panel for fixedly securing said retaining strip to the mesh panel; and at least one tab adapted to be fixedly secured to and extend from the edge of the trim set, said tab having an anchor for engaging at least one of said retainers to secure said tab between said retaining strip and the mesh panel, thereby removably securing the trim set in relation to the mesh panel.

2. The trim set attachment assembly of claim 1 wherien said retaining strip includes a plurality of spaced apart retainers extending generally perpendicular from said base to a distal end.

3. The trim set attachment assembly of claim 2 wherein said retaining strip includes a plurality of spaced apart flanges extending generally perpendicular from said elongated base to a distal end.

4. The trim set attachment assembly of claim 3 wherein each of said flanges includes an opening therethrough for receiving one of said tabs to fixedly secure said retaining strip to the mesh panel.

5. The trim set attachment assembly of claim 4 wherein said retaining strip includes a slit formed between each of said flanges and retainers for allowing said base to flex and bend along the contour of the seat assembly.

6. The trim set attachment assembly of claim 5 wherein said tab includes a trim piece having a first end adapted to be fixedly secured to the trim set and a second end fixedly secured to said anchor.

7. The trim set attachment assembly of claim 6 wherein said anchor is in the form of a hook for removably receiving said distal end of one of said retainers therein to removable secure the trim set to said retaining strip.

8. The trim set attachment assembly of claim 7 wherein said anchor of said tab extends longitudinally and parallel to said base of said retaining strip for engaging a plurality of said retainers to removably secure the trim set to said retaining strip.

9. The trim set attachment assembly of claim 8 wherein said retaining strip includes a plurality of retainers positioned between adjacent spaced apart flanges for receiving said tabs therebetween.

10. The trim set attachment assembly of claim 9 wherein each of said connectors includes a pin extending between a head and a collar forming a channel therebetween for capturing and retaining the mesh panel.

11. The trim set attachment assembly of claim 10 wherein each of said connectors includes a ball on the distal end of said collar for passing through the mesh panel and said opening in one of said flanges, wherein said flange is fixedly retained between said head and said collar.

12. The trim set attachment assembly of claim 11 wherein said flanges and retainers are integrally molded with said base to form said retaining strip.

\* \* \* \* \*